United States Patent [19]

Deller

[11] Patent Number: 4,560,308
[45] Date of Patent: Dec. 24, 1985

[54] CUTTING TOOL
[75] Inventor: David L. Deller, Troy, Ohio
[73] Assignee: TRW Inc., Cleveland, Ohio
[21] Appl. No.: 640,279
[22] Filed: Aug. 13, 1984
[51] Int. Cl.$^4$ ............................................. B26D 1/00
[52] U.S. Cl. .......................................... 407/53; 407/63
[58] Field of Search ...................... 407/53, 54, 61, 62, 407/63, 59, 55, 60; 144/221

[56] References Cited
U.S. PATENT DOCUMENTS

| | | | |
|---|---|---|---|
| 4,212,568 | 7/1980 | Minicozzi | 407/53 |
| 4,215,955 | 8/1980 | Lillie | 407/42 |
| 4,472,093 | 9/1984 | Hamilton | 407/42 |

Primary Examiner—Leonidas Vlachos

[57] ABSTRACT

A rotary cutting tool of the type comprising an elongated cylindrical body having a central axis about which it is rotated for performing cutting or material removal operations during relative movement in directions perpendicular to its axis of rotation. The body includes a shank end portion and a cutting end portion. The cutting end portion includes a plurality of generally continuous cutting edges lying at a uniform radial distance from the axis and extending in generally parallel helical paths about the body. Each of the cutting edges is preferably of generally sinusoidal configuration along its respective helical path with spaced portions of each edge having alternating positive and negative radial rake.

11 Claims, 6 Drawing Figures 4,560,308

CUTTING TOOL

BACKGROUND OF THE INVENTION

The subject invention is directed toward the art of rotary cutting tools and, more particularly, to that class of tools known as end milling cutters.

The invention is especially suited for incorporation in cutters formed from high speed tool steel and used for metal removal operations and will be described with reference thereto; however, as will become apparent, the invention is capable of broader application and could be incorporated in cutters formed of other materials and used for other types of cutting or material removal operations.

One of the primary goals in the design of milling cutters or end mills has been to produce a cutter capable of rapidly removing substantial quantities of material while leaving a comparatively smooth surface on the workpiece. In addition, it is, of course, desirable to have low power requirements for driving the tool and improved tool life.

To the above ends, the prior art has tried a variety of cutting edge configurations and designs. These designs have included "toothed" and intermittent edges and/or the incorporation of "chip-breaking" grooves in the faces of the cutting edges or the body of the cutter.

The most successful designs to date have involved the use of cutting edges having an undulating or sinusoidal configuration. Milling cutters of this general design are shown, for example, in U.S. Pat. Nos. 1,840,852 to Schotthoefer; 3,133,339 and 3,775,819 to Ribich; and 4,212,568 to Minicozzi. In these patents the cutting edges are given a sinusoidal configuration with the sine wave in each successive edge being slightly off-set from the preceding edge. By use of these edge configuration chip formation and chip removal is facilitated. In addition, when the entire sinusoidal edge lies at a uniform distance from the center axis of the cutter (i.e., there is no radial height difference along the cutting edge) a relatively smooth surface is produced on the workpiece.

SUMMARY OF THE INVENTION

The present invention provides a significant improvement in cutting action and tool life for tools of the type discussed above. Specifically, in accordance with one aspect of the subject invention a tool having a generally sinusoidal edge configuration is provided with the improvement which includes making the edge with alternating portions of positive and negative radial rake.

Preferably, and in accordance with a more limited aspect of the invention, the negative radial rake portions of the edge are located at the crests or peaks of the sinusoidal wave form.

By making the radial rake change from positive to negative in the manner discussed, superior chip-breaking characteristics are achieved, allowing higher productivity and/or longer tool life, with superior workpiece surface finish. The design produces chips of varying thickness which facilitates breaking of the chip into smaller, easier to handle pieces.

With edges formed in the manner described, there appears to be lower load on the cutting edges and a reduction in tool wear. In addition the horsepower requirements for driving the tool appear to be lower than for prior art tools operating under equivalent conditions.

DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENT

Figure 1:
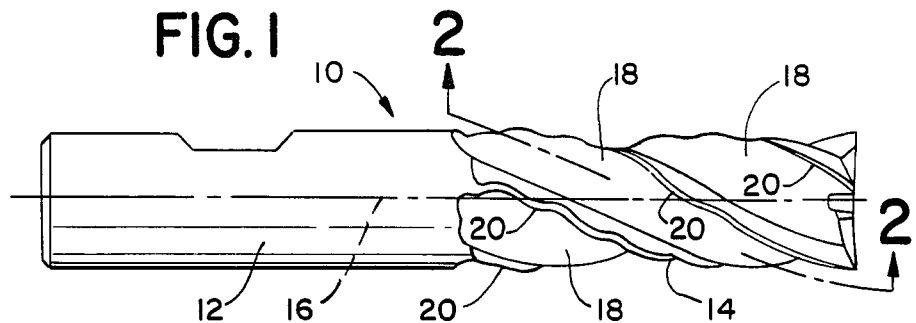
FIG. 1 is a side view of an end mill formed in accordance with a preferred embodiment of the invention.

Referring more particularly to the drawings wherein the showings are for the purpose of illustrating a preferred embodiment of the invention only, and not for the purpose of limiting same, FIG. 1 shows the overall arrangement of a rotary cutting tool 10 comprising an elongated, generally cylindrical body having a shank or mounting portion 12 and a cutting end portion 14. Tool 10 is of the type generally referred to as an end mill and, as is well-known, performs metal cutting or material removal operations by being rotated about its central longitudinal axis 16 while having translatory movement relative to the workpiece in a direction perpendicular to the axis of rotation.

While the tool could have substantially any number of flutes, it is illustrated as having four generally parallel and helically extending flute 18. In the embodiment shown, the flutes 18 are uniformly spaced about the body and extended longitudinally throughout the length of cutting portion 14.

Figure 2:
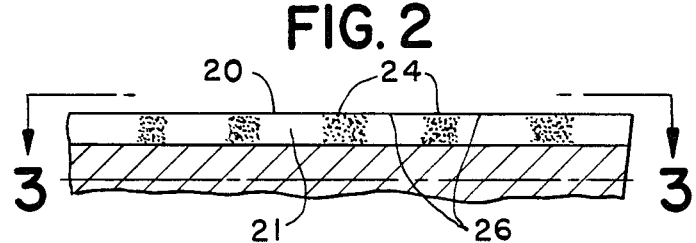
FIG. 2 is a cross-sectional view taken on line 2—2 of FIG. 1.

The junctures between the flutes 18 and the outer surface of the body define four cutting edges 20. In the subject embodiment, the edges 20 are continuous throughout their length and have all portions located at a constant radial distance from axis 16. This is best shown in FIG. 2.

Figure 5:
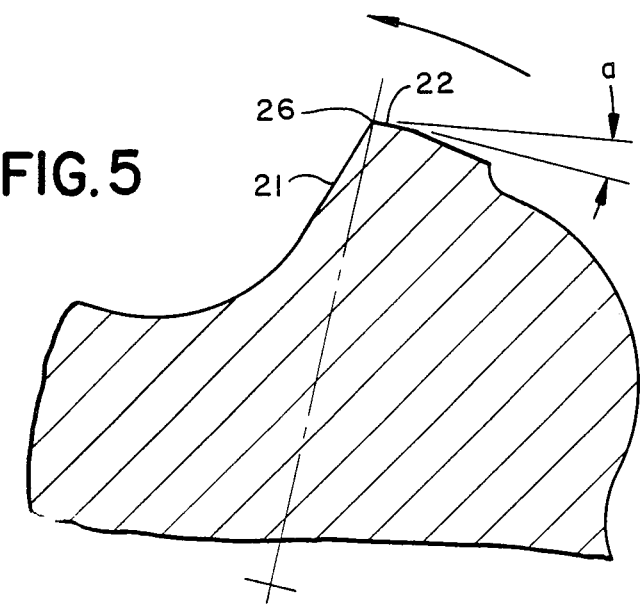
Figure 6:
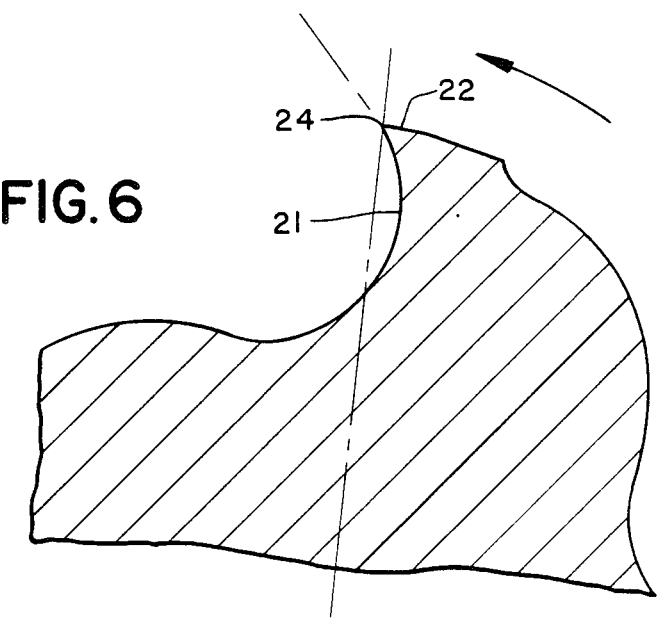

As best shown in FIGS. 5 and 6, the flutes are cleared behind each cutting edge so as to leave a relatively narrow margin 22 which extends along each cutting edge 20. In addition, each margin is preferably given a relief angle "a" in the range of 2° to 20 degrees.

Figure 4:
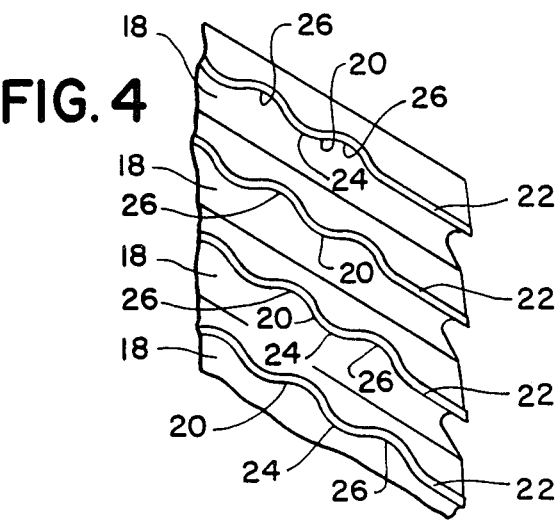
FIG. 4 is a development of the cutting end portion of the tool showing the relationship between successive cutting edges; and, FIGS. 5 and 6 are enlarged sectional views taken on lines 5—5 and 6—6, respectively of FIG. 3.

Referring more particularly to FIG. 4, it will be noted that each cutting edge 20 is preferably formed with a series of crests or peaks 24 separated by valleys 26. The peaks and valleys are relatively uniformly spaced and define continuous cutting edges of generally sinusoidal shape. As will become apparent, the shapes of the peaks and valleys can vary within the scope of the invention and do not have to define a true or regular sinusoidal wave shape. In addition, while continuous edges are much preferred, it is believed that good results can be obtained with a few regularly or even irregularly spaced discontinuities.

In accordance with the preferred embodiment, the sine wave forms in successive edges 20 are longitudinally offset a slight amount as shown in FIG. 4. In this manner, in any transverse plane the cutting edges present a constantly varying angle of attack to the workpiece.

The relationships thus far described are known and are shown, for example, in the aforementioned U.S. patents. The advantages of the sinusoidal edge configuration and its ability to form discrete easily handled chips is well-documented. Typically, the prior art has attempted to improve the cutting action of these mills by making the cutting face of the cutting edges with a constant, fairly highly positive radial rake. For the purposes of this description, and in accordance with conventional usage in the art, radial rake is considered positive if the cutting face surface 21 trails the cutting edge 20 in rotation (see FIG. 6) and negative if it leads the edge (see FIG. 5). The amount of positive or negative rake is determined by the included angle formed between a radius line passing through a point on he cutting edge and a tangent to the rake face which lies in a diametrical plane and passes through the same point on the cutting edge.

Figure 3:
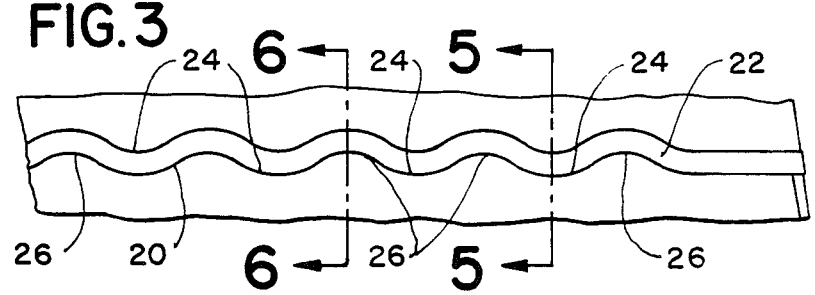
FIG. 3 is a view taken on line 3—3 of FIG. 2 (the view has been projected so as to shown the edge as it would appear on the cutting cylinder)

In accordance with the subject invention, it has been found that improved cutting action, chip formation and tool life can be achieved by deviating from the accepted standard of constant positive radial rake and causing the radial rake angle to vary between positive and negative along the edge. Specifically, as shown in FIGS. 3, 5 and 6, the cutting edges of the tool of the subject invention are provided with alternating, sequentially spaced portions of positive and negative radial rake. In the preferred embodiment, the negative rake portions are located at the peaks or crests of the wave form and the positive rake portions are located in the valleys. The extent of the negative portions can vary but they preferably have a length in the range of 0.030"-0.100".

As should be appreciated, the relative, spacing and size relationships of the sinusoidal wave forms can vary depending upon a variety of factors (e.g., material being cut, tool diameter, etc.); however, the following are believed to be most suitable for general purposes:

Period of waveform—Greater than 0.2 times tool diameter

Amplitude of waveform—Less than 0.2 times tool diameter

Rake angle—Positive Portions up to 25° positive Negative Portions up to 6° negative A preferred embodiment of the invention has been described in substantial detail. Obviously, modifications and alterations of this embodiment will occur to others upon a reading and understanding of the specification. It is my intention to include all such modifications and alterations as part of my invention insofar as they come within the scope of the appended claims.

Having thus described this invention, I claim:

1. In an end mill of the type comprising an elongated generally cylindrical body having a central axis, a shank, and a cutting end including a plurality of generally helically extending cutting edges located a uniform radial distance from said central axis the improvement wherein at least one of said cutting edges has a generally sinusoidal configuration and a cutting face with alternating portions of positive and negative radial rake.

2. The improvement as defined in claim 1 wherein said at least one cutting edge has a continuous generally sinusoidal configuration of alternate peaks and valleys.

3. The improvement as defined in claim 2 wherein said portions of negative radial rake are located at the peaks and said portions of positive radial rake are located at the valleys of said sinusoidal configuration.

4. The improvement as defined in claim 1 wherein all of said cutting edges have a generally sinusoidal configuration of alternate peaks and valleys with the portions of negative radial rake being located generally at said peaks and said portions of positive radial rake being located at said valleys.

5. The improvement as defined in claim 4 wherein said negative radial rake is in the range of up to 7° and said positive radial rake is in the range of up to 25°.

6. In an end mill of the type comprising an elongated generally cylindrical body having a central axis, a shank, and a cutting end including at least one helically extending cutting edge substantially all portions of which lay a uniform radial distance from said central axis the improvement wherein said cutting edge includes alternating spaced portions of positive and negative radial rake.

7. The improvement of claim 6 wherein said cutting edge is comprised of alternating peaks and valleys.

8. The improvement of claim 7 wherein said portions of negative radial rake are located on said peaks.

9. The improvement of claim 7 wherein said peaks and valleys have a generally sinusoidal shape.

10. The improvement of claim 9 wherein said peaks are spaced apart a distance in the range of 30-70% times the diameter of said body.

11. The improvement of claim 9 wherein the circumferential distance between said peaks and valleys is in the range of 1-20% of the diameter of said body.

* * * * *